United States Patent
Tambs et al.

(10) Patent No.: US 12,454,934 B2
(45) Date of Patent: Oct. 28, 2025

(54) SUBMERGED FIN FOR WAVE ENERGY CONVERSION

(71) Applicant: Schlumberger Technology Corporation, Sugar Land, TX (US)

(72) Inventors: Erling Tambs, Kristiansand (NO); Jarle Hardeland Oevsthus, Hamresanden (NO); Alv Repstad, Kristiansand (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/690,625

(22) PCT Filed: Sep. 12, 2022

(86) PCT No.: PCT/US2022/043206
§ 371 (c)(1),
(2) Date: Mar. 8, 2024

(87) PCT Pub. No.: WO2023/043694
PCT Pub. Date: Mar. 23, 2023

(65) Prior Publication Data
US 2024/0376857 A1 Nov. 14, 2024

Related U.S. Application Data

(60) Provisional application No. 63/243,830, filed on Sep. 14, 2021.

(51) Int. Cl.
*F03B 13/18* (2006.01)
*F03B 15/02* (2006.01)

(52) U.S. Cl.
CPC .............. *F03B 13/18* (2013.01); *F03B 15/02* (2013.01)

(58) Field of Classification Search
CPC ................................. F03B 13/18; F03B 15/02
USPC ........................................ 290/42–44, 53–55
See application file for complete search history.

(56) References Cited

U.S. PATENT DOCUMENTS

| 8,918,225 | B2 * | 12/2014 | Lazaris | H02J 3/381 |
| | | | | 399/346 |
| 2005/0236841 | A1 | 10/2005 | Henriksen | |
| 2006/0125242 | A1 * | 6/2006 | Fraenkel | F03B 17/061 |
| | | | | 290/54 |
| 2007/0297903 | A1 | 12/2007 | Morris | |
| 2011/0018276 | A1 | 1/2011 | Whittaker | |
| 2011/0241347 | A1 * | 10/2011 | Boureau | F03D 9/25 |
| | | | | 405/195.1 |
| 2012/0119503 | A1 * | 5/2012 | van Breems | F03D 9/28 |
| | | | | 290/55 |

(Continued)

FOREIGN PATENT DOCUMENTS

WO 2018087571 A2 5/2018

OTHER PUBLICATIONS

International Search Report and Written Opinion issued in International Patent application PCT/US2022/043206 on Dec. 14, 2022, 9 pages.

*Primary Examiner* — Hoang M Nguyen
(74) *Attorney, Agent, or Firm* — Jeffrey D. Frantz (57) ABSTRACT

An energy conversion system includes a power takeoff system, a fin connected to the power takeoff system, and a control system on board the fin. The fin is submerged below a surface of the sea, and the fin is configured to use subsurface wave motions to extract energy.

10 Claims, 8 Drawing Sheets

(56) References Cited

U.S. PATENT DOCUMENTS

2012/0191265 A1\* 7/2012 Keir .................. F03B 15/08
                                                                                700/287
2014/0116042 A1     5/2014 Lo
2015/0130191 A1     5/2015 Houvener \* cited by examiner

SUBMERGED FIN FOR WAVE ENERGY CONVERSION

CROSS-REFERENCE TO RELATED APPLICATION

This application claims priority to International Application No. PCT/US2022/043206, entitled "Submerged Fin for Wave Energy Conversion," filed Sep. 12, 2022, which claims priority to and the benefit of U.S. Provisional Patent Application No. 63/243,830, entitled "Submerged Fin for Wave Energy Conversion," filed on Sep. 14, 2021, the entireties of which are incorporated by reference herein.

BACKGROUND

An energy transition has begun as the world's energy use changes from fossil fuels to more renewable sources. Many new regulations will steer businesses toward lower carbon footprints. Further, market and regulatory mechanisms may incentivize the transition to newer and more sustainable energy sources. Accordingly, there is a need for alternative ways to generate power to facilitate the energy transition.

SUMMARY

An energy conversion system according to one or more embodiments of the present disclosure includes a platform anchored to a sea floor, at least one column disposed on the platform, a power takeoff system connected to the at least one column, and a fin connected to the power takeoff system. According to one or more embodiments of the present disclosure, the fin is submerged below a surface of the sea, and the fin is configured to use subsurface wave motions to extract energy.

A method of extracting energy from subsurface waves according to one or more embodiments of the present disclosure includes submerging a fin below a surface of the sea, wherein the fin is connected to a power takeoff system including a hydraulic cylinder, at least one accumulator, and at least one generator. The method according to one or more embodiments of the present disclosure also includes controlling at least one of a position, an angle, and a rotation of the fin subsea by controlling a resistance in the connected power takeoff system, pumping hydraulic fluid within the power takeoff system to adjust the resistance in the power takeoff system, storing the hydraulic fluid within the at least one accumulator, and releasing the hydraulic fluid stored in the at least on accumulator through the at least one generator to produce electric energy.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

In the specification and appended claims, the terms "connect," "connection," "connected," "in connection with," and "connecting," are used to mean "in direct connection with," in connection with via one or more elements." The terms "couple," "coupled," "coupled with," "coupled together," and "coupling" are used to mean "directly coupled together," or "coupled together via one or more elements." The term "set" is used to mean setting "one element" or "more than one element." As used herein, the terms "up" and "down," "upper" and "lower," "upwardly" and "downwardly," "upstream" and "downstream," "uphole" and "downhole," "above" and "below," "top" and "bottom," and other like terms indicating relative positions above or below a given point or element are used in this description to more clearly describe some embodiments of the disclosure. Commonly, these terms relate to a reference point at the surface from which drilling operations are initiated as being the top point and the total depth being the lowest point, wherein the well (e.g., wellbore, borehole) is vertical, horizontal, or slanted relative to the surface.

The present disclosure generally relates to wave energy conversion. Specifically, one or more embodiments of the present disclosure relate to a wave energy conversion system that includes a fin connected to a power takeoff system. By submerging the fin subsea, the fin is able to use subsurface wave motions to extract energy. The fin of the wave energy conversion system according to one or more embodiments of the present disclosure will take advantage of drag and/or lift induced forces created by the motion of water particles around the fin. Moreover, the position of the fin may be adjusted by controlling the resistance in the connected power takeoff system. Advantageously, the power takeoff system may convert the wave energy extracted by the submerged fin and transmit the converted energy for various power applications.

Figure 1:
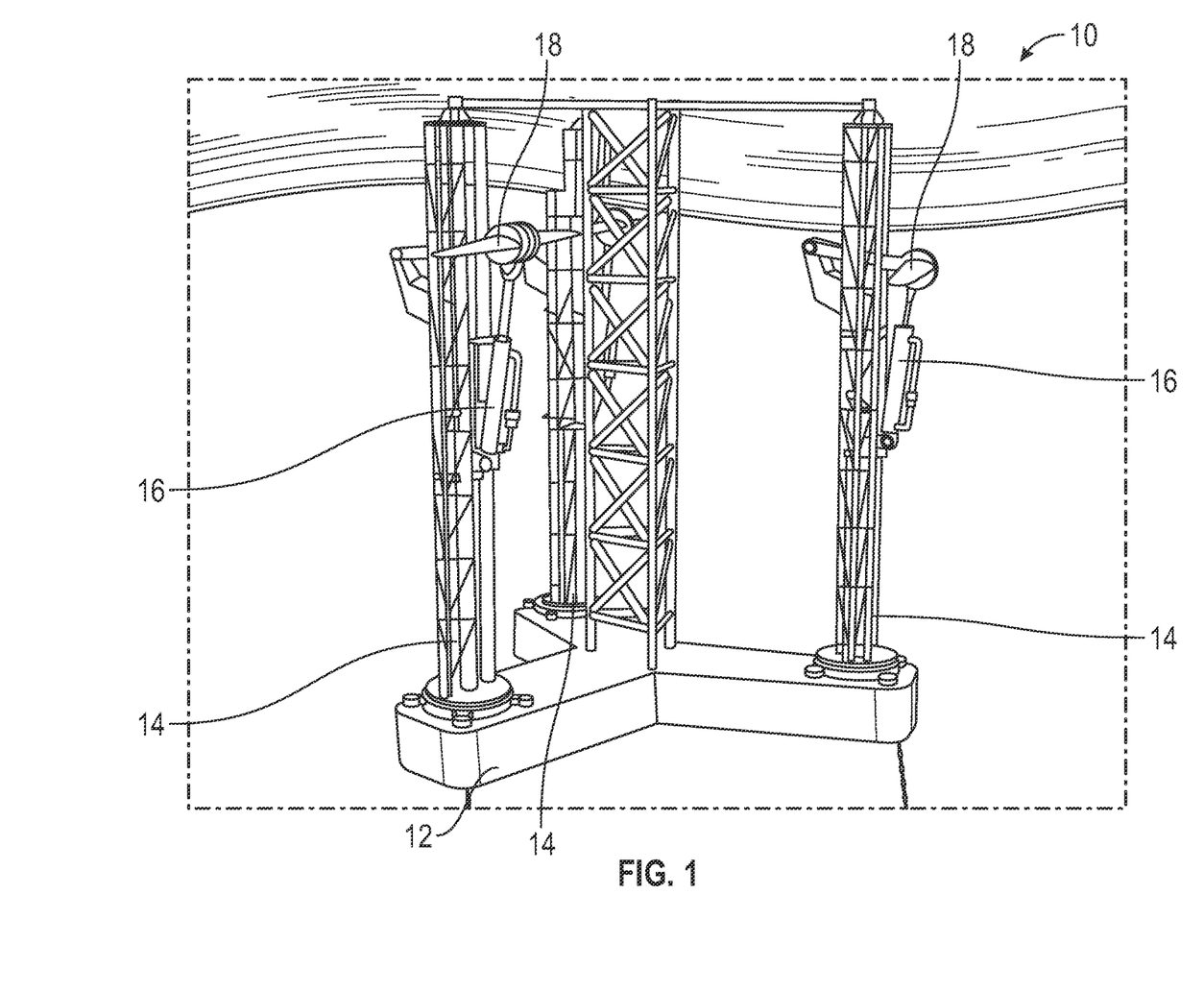
FIG. 1 shows an energy conversion system according to one or more embodiments of the present disclosure.

Referring now to FIG. 1, an energy conversion system 10 according to one or more embodiments of the present disclosure is shown. As shown in FIG. 1, for example, the energy conversion system 10 may include a platform 12 anchored to a sea floor and at least one column 14 disposed on the platform 12. While FIG. 1 shows that there are three columns 14 disposed on the platform 12, this number is not limiting, and different amounts of columns 14 may be disposed on the platform 12 without departing from the scope of the present disclosure.

Still referring to FIG. 1, the energy conversion system 10 according to one or more embodiments of the present disclosure may also include a power takeoff system 16 connected to the column 14 and a fin 18 connected to the power takeoff system 16. As shown in FIG. 1, according to one or more embodiments of the present disclosure, the fin 18 is submerged below a surface of the sea. As further described below, the fin 18 is configured to use subsurface wave motions to extract energy for power applications.

Figure 2:
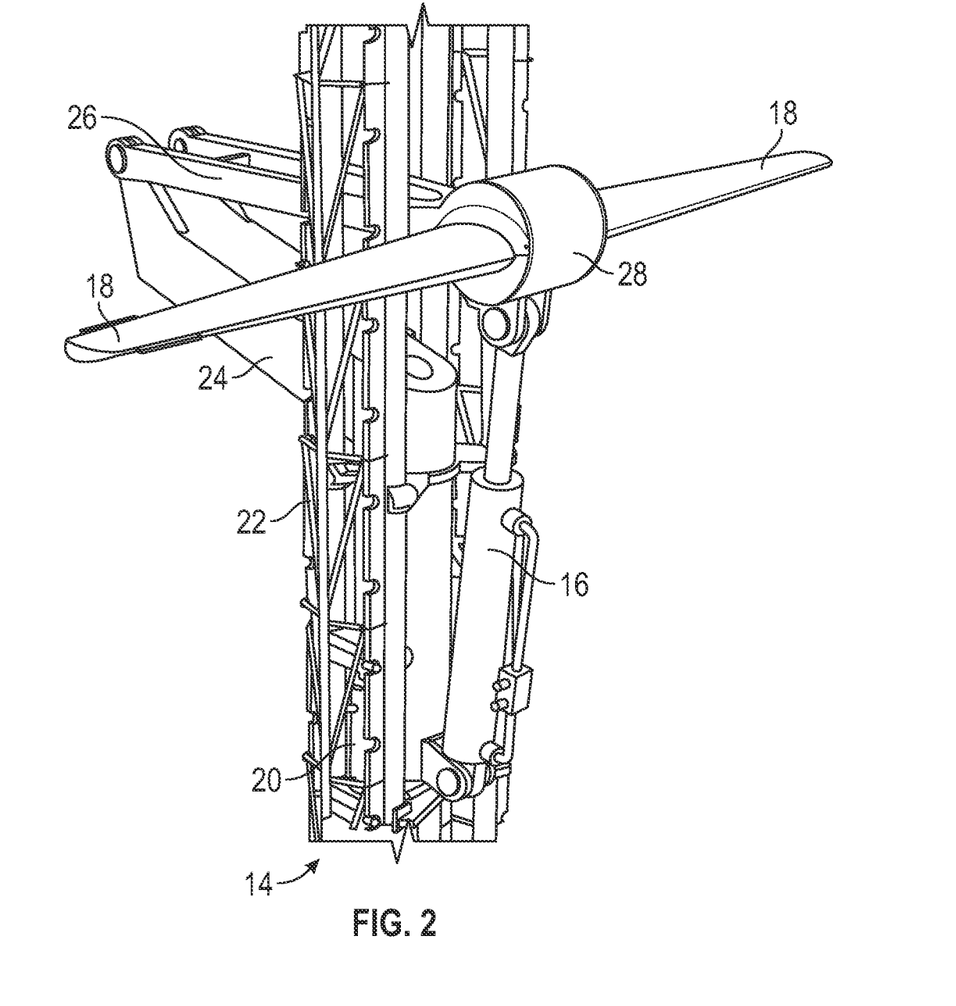
FIG. 2 shows a fin connected to a power takeoff system of an energy conversion system according to one or more embodiments of the present disclosure.

Referring now to FIG. 2, a fin 18 connected to a power takeoff system 16 of an energy conversion system 10 according to one or more embodiments of the present disclosure is shown. Further, FIG. 2 shows the power takeoff system 16 connected to the column 14 as previously described. As shown in FIG. 2, the column 14 may include a climb system 20 and a guide and climb frame 22, according to one or more embodiments of the present disclosure. As further shown in FIG. 2, the fin 18 and the power takeoff system 16 may be connected to the cylinder 14 via a supporting body 24, which may be connected to a passive stabilizer link 26, for example.

Still referring to FIG. 2, the fin 18 according to one or more embodiments of the present disclosure may include a fin hub 28. According to one or more embodiments of the present disclosure, the fin hub 28 may include a control system that controls at least one of a position, an angle, and a rotation of the fin subsea. In this way, the control system disposed in the fin hub 28 allows the fin 18 to self-adjust to remain at an optimal position for power takeoff as the fin 18 interacts with the subsurface wave motions. For example, due to wave irregularities, the forces acting on the fin 18 will become unbalanced. When this happens, the passive stabilizer link 26 will allow the fin 18 to rotate by a certain amount around the x-axis relative to the fin hub 28 to re-balance the fin 18. Moreover, if a misalignment in the energy conversion system 10 occurs during an upstroke, the active adjustment fins 18 will counter the misalignment on the downstroke. The energy conversion system 10 may also be predictive, based on wave measurements, according to one or more embodiments of the present disclosure.

Figure 3:
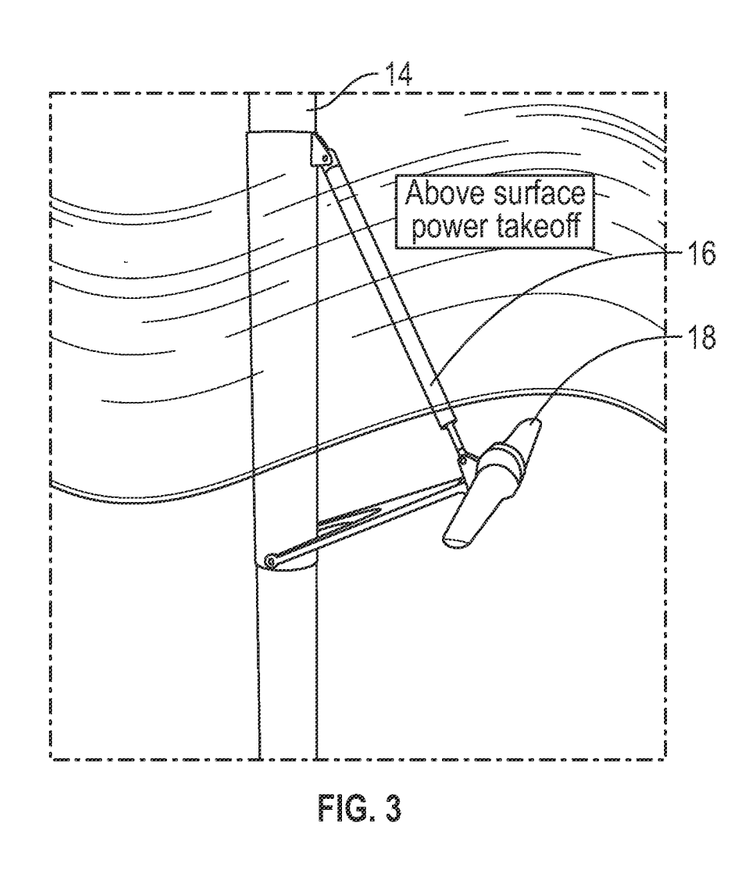
FIG. 3 shows a fin connected to a power takeoff system in an operational configuration according to one or more embodiments of the present disclosure.

Referring now to FIG. 3, a fin 18 connected to a power takeoff system 16 of an energy conversion system 10 according to one or more embodiments of the present disclosure is shown. As shown in FIG. 3, the power takeoff system 16 is connected to the column 14 above the surface of the sea, according to one or more embodiments of the present disclosure. In other embodiments of the present disclosure, the power takeoff system 16 may be connected to the column 14 below the surface of the sea, for example.

Figure 4:
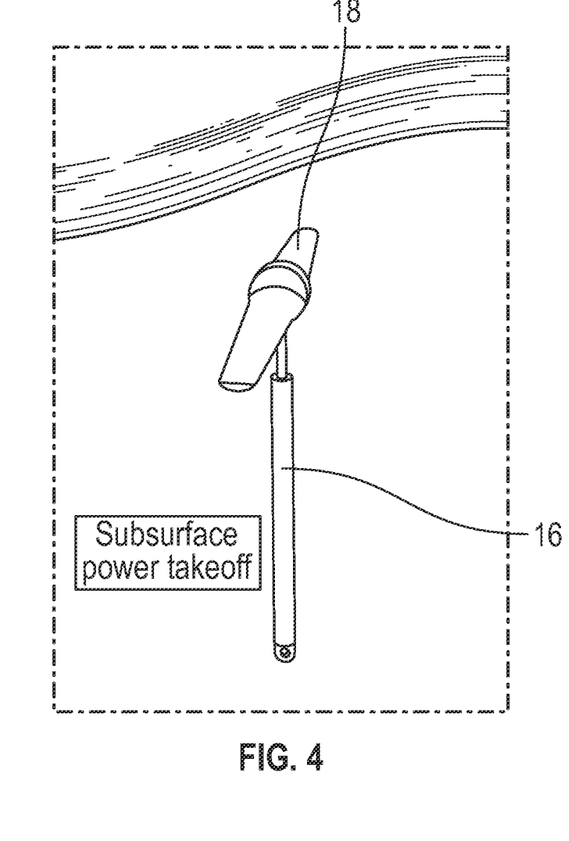
FIG. 4 shows a fin connected to a power takeoff system in an alternative operational configuration according to one or more embodiments of the present disclosure.

Referring now to FIG. 4, a fin 18 connected to a power takeoff system 16 in an alternative operational configuration according to one or more embodiments of the present disclosure is shown. Specifically, FIG. 4 shows that the energy conversion system 10 may include the fin 18 connected to the power takeoff system 16 without any columns 14 or an associated platform 12. In such embodiments of the present disclosure, the fin 18 is submerged below the surface of the sea, and a control system may be disposed on board the fin 18. With the configuration shown in FIG. 4, for example, the fin 18 is able to use subsurface wave motions to extract energy in accordance with one or more embodiments of the present disclosure.

Figure 5:
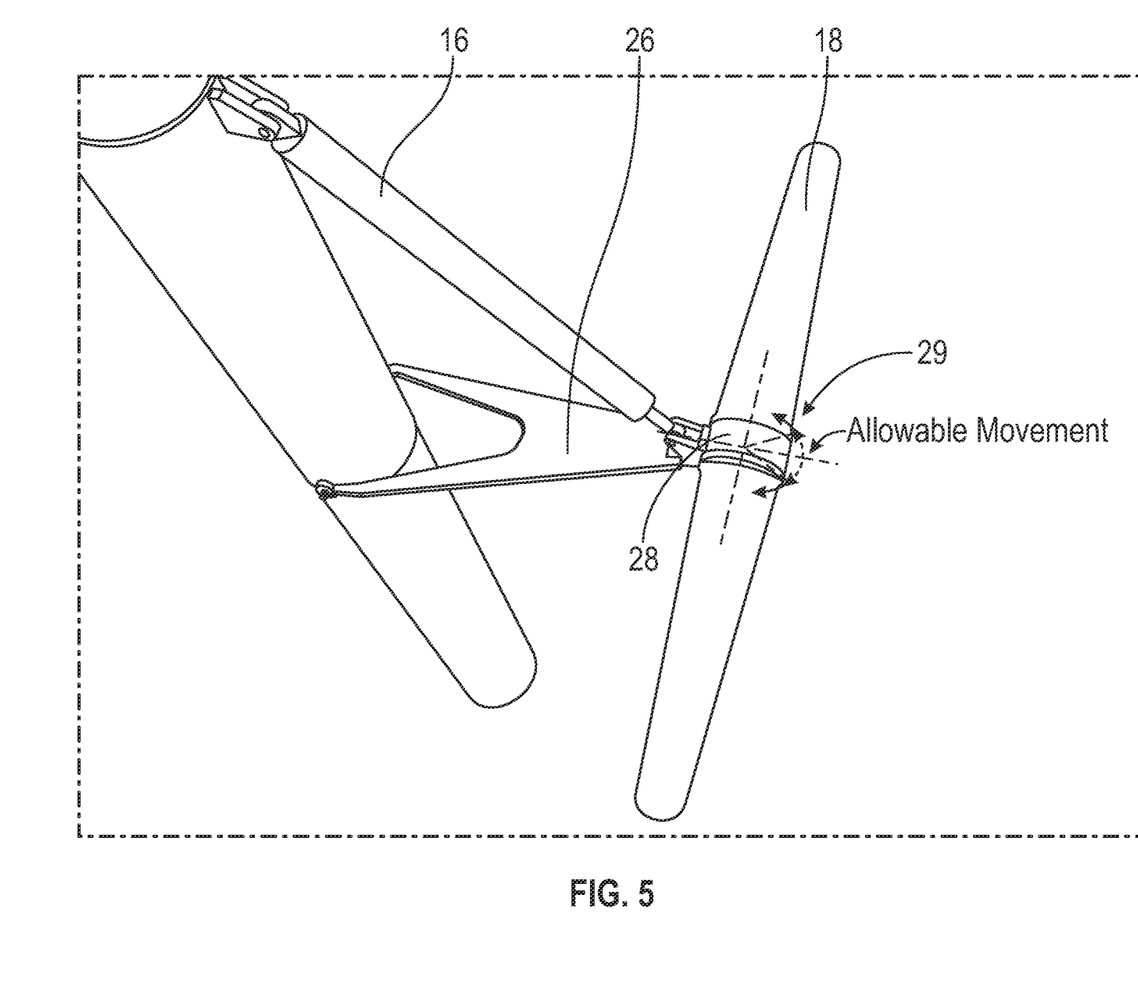
FIG. 5 shows an alternative view of a fin connected to a power takeoff system according to one or more embodiments of the present disclosure.

Referring now to FIG. 5, an alternative view of a fin 18 connected to a power takeoff system 16 according to one or more embodiments of the present disclosure is shown. As previously described, the fin hub 28 of the fin 18, may include a control system 29 that controls at least one of a position, an angle, and a rotation of the fin subsea. For example, the control system 29 of the fin 18 may communicate with wave measurements by controlling rotation of the fin 18 and other functions to prevent overload of the fin 18 according to one or more embodiments of the present disclosure. As also shown in FIG. 5, as previously described, the passive stabilizer link 26 will allow the fin 18 to rotate by a certain amount around the x-axis relative to the fin hub 28 to re-balance the fin 18, as needed. Moreover, the control system 29 of the fin 18 may be able to maintain the fin 18 at a level and optimal position as the fin 18 interacts with subsurface waves, according to one or more embodiments of the present disclosure. For example, according to one or more embodiments of the present disclosure, the control system 29 may be able to adjust (i.e., increase or decrease) the lift, drag, or turbulence on a certain portion of the fin 18 to realign and straighten the fin 18 as the fin 18 interacts with subsurface waves. In this way, the fin 18 will be able to take advantage of drag and/or lift induced forces created by the motion of water particles around the fin 18 to ultimately facilitate the conversion of wave energy to electric energy as further described below.

Advantageously, the control system 29 of the fin 18 may be connected to a cloud-based service in one or more embodiments of the present disclosure. In this way, control system 29 may be able to utilize weather forecast data, regional sensor data, or other types of data to determine the appropriate fin angle, the amount to rotate the fin 18 for re-balancing, or whether the energy conversion system 10 should enter an emergency mode in order to protect the fin 18 from becoming damaged. According to one or more embodiments of the present disclosure, if the energy conversion system 10 enters an emergency mode, the fin 18 may be protected by further submerging the fin 18 to a deeper depth below the surface of the sea, or by allowing the fin 18 to be pulled out of the sea, for example.

Figure 6:
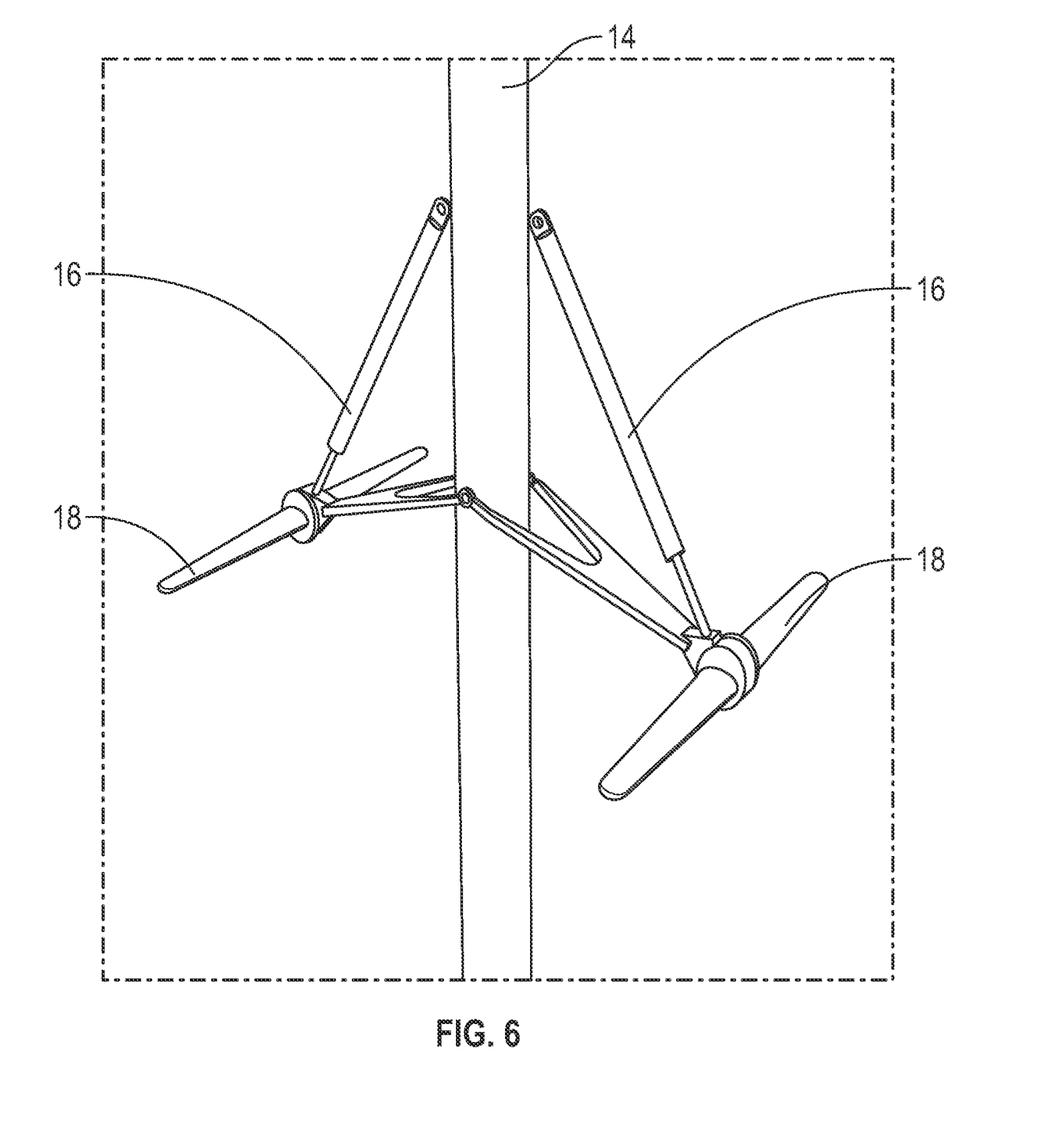
FIG. 6 shows two fins connected to two corresponding power takeoff systems of an energy conversion system according to one or more embodiments of the present disclosure.

Referring now to FIG. 6, two fins 18 connected to two corresponding power takeoff systems 16 on a single column 14 of an energy conversion system 10 according to one or more embodiments of the present disclosure are shown. As previously described, the two fins 18 may be submerged below the surface of the sea, and the two fins 18 may be configured to use subsurface wave motions to extract energy. As also previously described, the two fins 18 may each include a control system that controls at least one of a position, an angle, and a rotation of the two fins 18 subsea, and that otherwise functions as the previously described control system 29.

Figure 7:
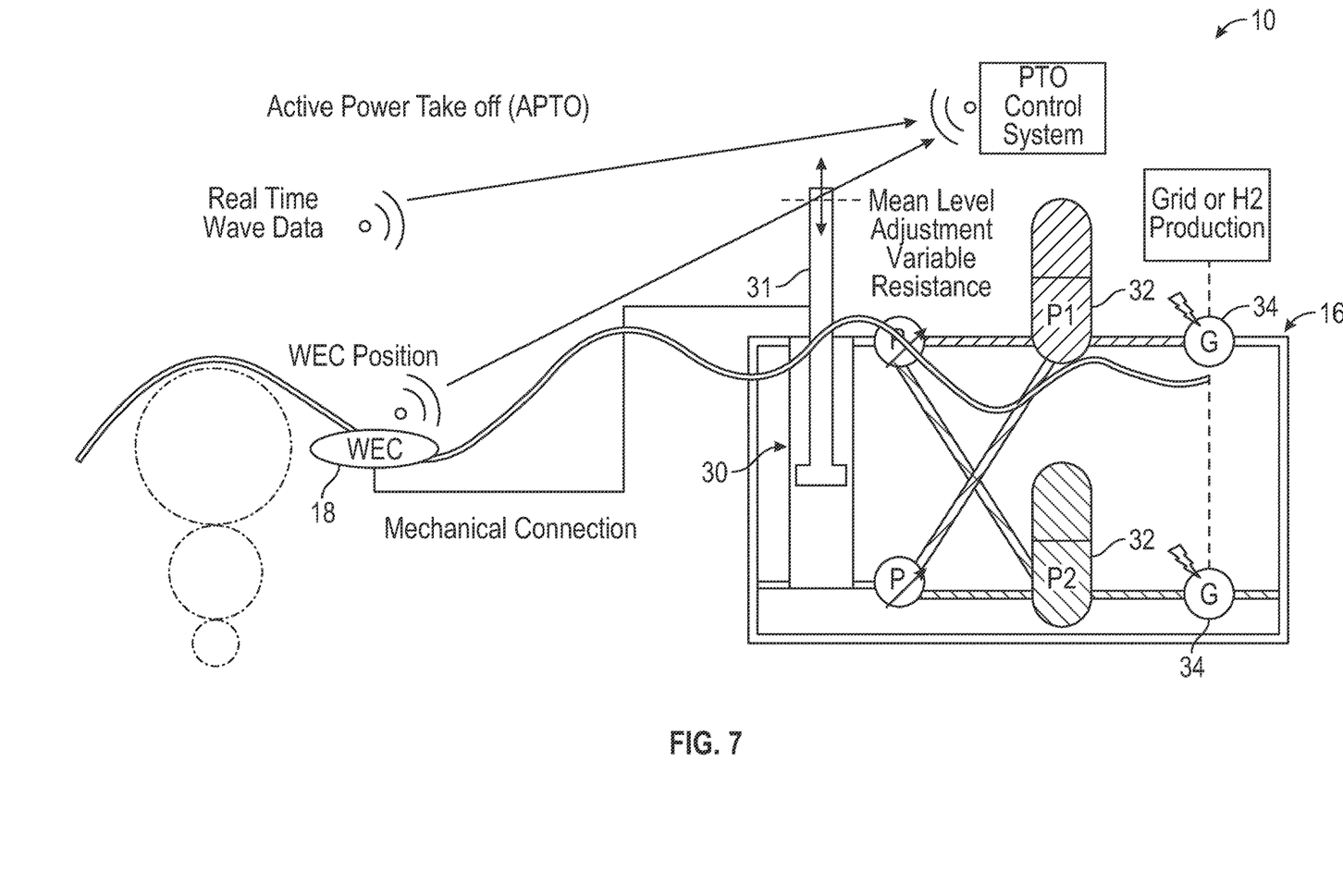
FIG. 7 shows how a fin connected to a power takeoff system functions in an energy conversion system according to one or more embodiments of the present disclosure.

In addition to the above, the control system 29 according to one or more embodiments of the present disclosure may control the fin 18 subsea by controlling a variable resistance in the connected power takeoff system 16, as shown in FIG. 7, for example. Specifically, FIG. 7 shows how a fin 18 connected to a power takeoff system 16 functions in an energy conversion system 10 according to one or more embodiments of the present disclosure. As shown in FIG. 7, the fin 18 may be mechanically connected to the power takeoff system 16, as previously described. As also shown in FIG. 7, the power takeoff system 16 may include a hydraulic cylinder 30, one or more accumulators 32, and one or more generators 34 connected in a closed hydraulic system. In operation, as subsurface waves interact with the fin 18, the fin 18 produces a force that translates into resistance within the power takeoff system 16. According to one or more embodiments of the present disclosure, the hydraulic cylinder 30 of the power takeoff system 16 includes a hydraulic piston 31 that is able to move up and down to adjust and optimize the variable resistance within the power takeoff system 16 based on the characteristics of the subsurface waves that are acting on the fin 18. For example, the rate that hydraulic pressure is bled within the power takeoff system 16 may be adjusted depending on the size of the subsurface waves, for example, as detected by the control system on board the fin 18 or by other real time wave data. As the hydraulic piston 31 of the hydraulic cylinder 30 moves up and down, hydraulic fluid may be pumped within the power takeoff system 16 in both directions, thereby pushing hydraulic fluid into one or both of the accumulators 32 from either side. Thereafter, hydraulic fluid stored in the accumulators 32 may be released through generators 34 to produce electric energy.

Figure 8A:
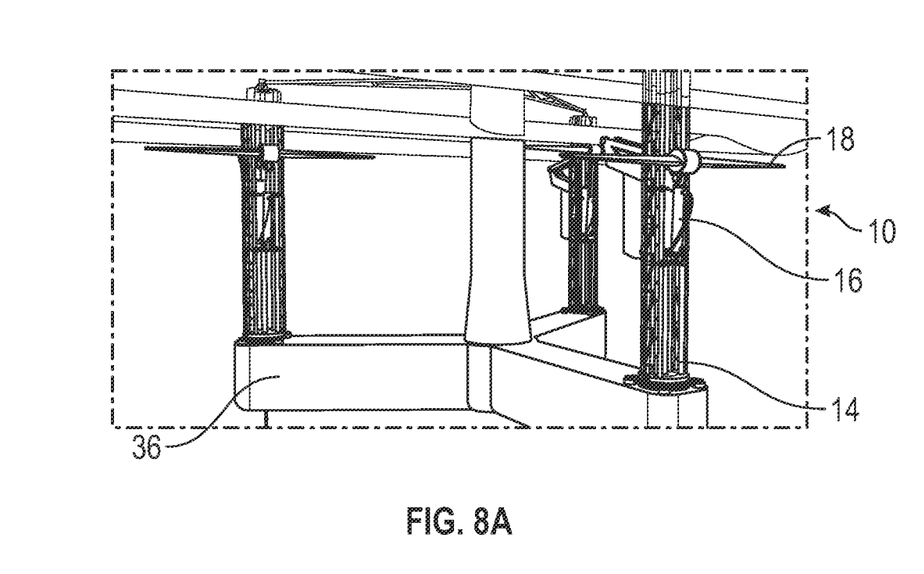
FIGS. 8A and 8B show an energy conversion system according to one or more embodiments of the present disclosure integrated in a windmill foundation.
Figure 8B:
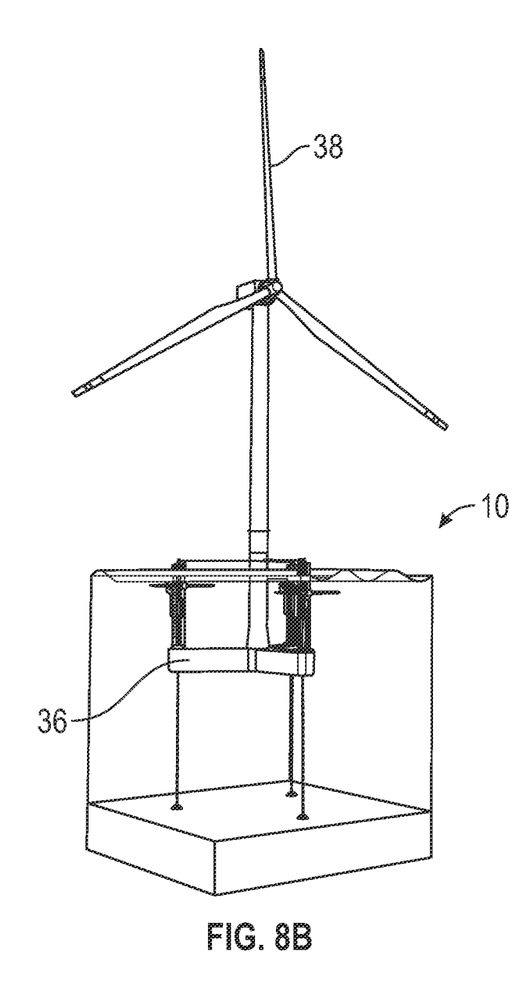

Referring now to FIGS. 8A and 8B, an energy conversion system 10 according to one or more embodiments of the present disclosure is shown integrated into a windmill foundation 36. Specifically, FIGS. 8A and 8B show the energy conversion system 10, which may have at least one column 14 disposed on the windmill foundation 36, a power takeoff system 16 connected to the at least one column 14, and a fin 18 connected to the power takeoff system 16, as previously described. Moreover, the windmill foundation 36 shown in FIGS. 8A and 8B may be a floating windmill foundation 36 that is disposed subsea without being rigidly fixed to the sea floor. As further shown in FIG. 8B, a windmill 38 may be attached to the floating windmill foundation 36, according to one or more embodiments of the present disclosure.

Figure 9A:
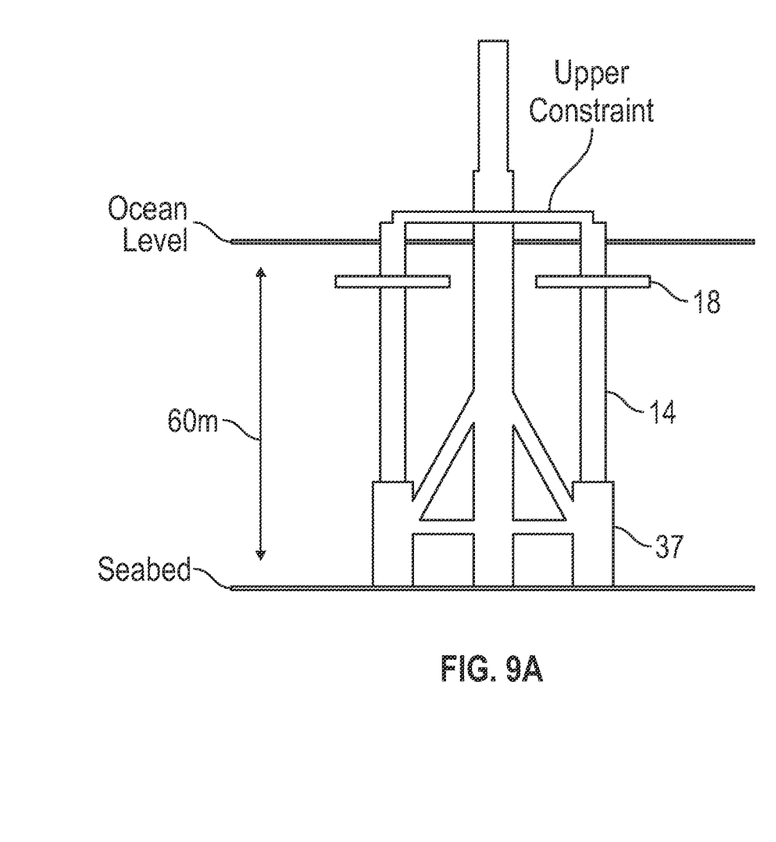
FIGS. 9A and 9B show an energy conversion system according to one or more embodiments of the present disclosure integrated in an alternative windmill foundation.
Figure 9B:
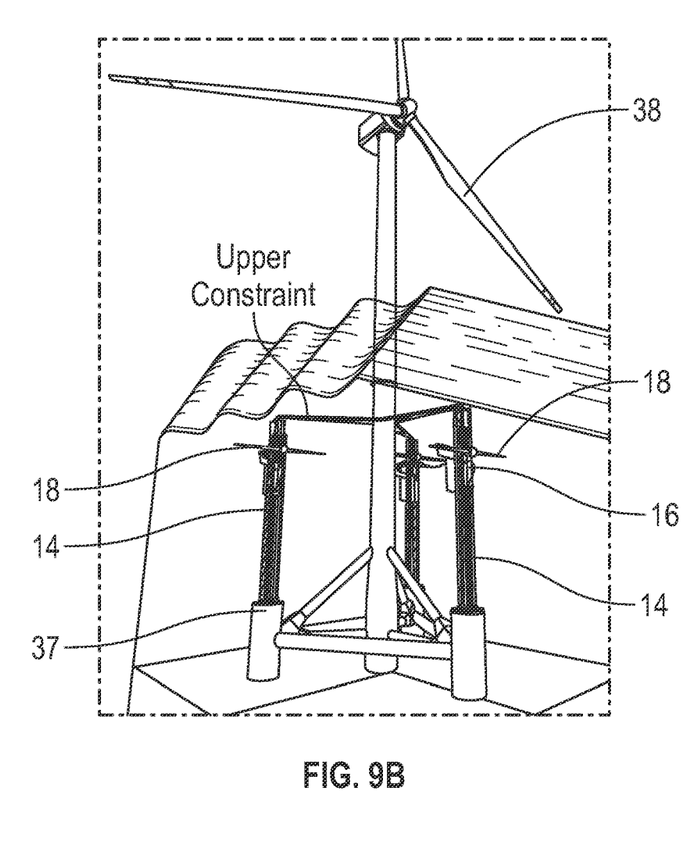

Referring now to FIGS. 9A and 9B, an energy conversion system 10 according to one or more embodiments of the present disclosure is shown integrated into an alternative windmill foundation 37. Specifically, FIGS. 9A and 9B show the energy conversion system 10, which may have at least one column 14 disposed on the alternative windmill foundation 37, a power takeoff system 16 connected to the at least one column 14, and a fin 18 connected to the power takeoff system 16, as previously described. Moreover, the windmill foundation 37 shown in FIGS. 9A and 9B may be a submerged windmill foundation 37 that is fixed to the sea floor. As further shown in FIG. 9B, a windmill 38 may be attached to the fixed submerged windmill foundation 37, according to one or more embodiments of the present disclosure.

Windmill foundations 36, 37, as previously described, may already be in close proximity to an existing grid. As such, integrating the energy conversion system 10 according to one or more embodiments of the present disclosure into such windmill foundations 36, 37 may be advantageous due to the accessibility of an existing grid. Moreover, integrating the energy conversion system 10 according to one or more embodiments of the present disclosure into such windmill foundations 36, 37 may allow both wind energy and wave energy to be converted into electric energy for power applications from a single system.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. An energy conversion system comprising:
   a platform anchored to a sea floor;
   at least one column disposed on the platform;
   a power takeoff system connected to the at least one column, wherein the power takeoff system includes a first arm including a piston-cylinder assembly, and wherein the first arm is coupled to a first joint;
   a fin connected to the power takeoff system, wherein the fin is submerged below a surface of the sea; and
   a second arm coupled to a second joint, wherein the first and second arms are coupled together at a third joint,
   wherein the fin is coupled to the first and second arms adjacent the third joint,
   wherein the fin is configured to use subsurface wave motions to extract energy via the power takeoff system,
   wherein the piston-cylinder assembly includes a piston configured to move in an axial motion in a cylinder in response to the subsurface wave motions against the fin, and
   wherein the first and second arms rotate about the first, second, and third joints as the fin drives the piston to move in the axial motion in the cylinder in response to the subsurface wave motions against the fin.

2. The energy conversion system of claim 1, wherein the fin self-adjusts to remain at an optimal position for power takeoff during interaction with the subsurface wave motions.

3. The energy conversion system of claim 1, wherein the power takeoff system comprises an electric generator driven by a hydraulic fluid pumped by the piston-cylinder assembly.

4. The energy conversion system of claim 1, wherein the fin comprises a control system that controls a position, an angle, and a rotation of the fin subsea.

5. The energy conversion system of claim 4, wherein the control system controls the fin subsea by controlling a variable resistance in the connected power takeoff system.

6. The energy conversion system of claim 4, wherein the control system protects the fin when the energy conversion system enters an emergency mode.

7. The energy conversion system of claim 1, further comprising:
   a second power takeoff system connected to the column; and
   a second fin connected to the second power takeoff system, wherein the second fin is submerged below the surface of the sea, and
   wherein the second fin is configured to use the subsurface wave motions to extract energy via the second power takeoff system, and
   wherein the second power takeoff system comprises a second piston-cylinder assembly having a second piston configured to move in an axial motion in a second cylinder in response to the subsurface wave motions against the second fin.

8. The energy conversion system of claim 7, wherein the second fin comprises a second control system that controls a position, an angle, and a rotation of the second fin subsea.

9. The energy conversion system of claim 1, wherein the platform is a windmill foundation.

10. The energy conversion system of claim 1, wherein the power takeoff system comprises an accumulator coupled to the piston-cylinder assembly, and the accumulator is configured to receive hydraulic pressure from both upstroke and downstroke directions of the piston in the cylinder of the piston-cylinder assembly.

\* \* \* \* \*